US011901656B2

(12) United States Patent
Chen et al.

(10) Patent No.: US 11,901,656 B2
(45) Date of Patent: Feb. 13, 2024

(54) ELECTRICAL CONNECTOR WITH A REINFORCING MEMBER

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: De-Jin Chen, Kunshan (CN); Jin-Ting Ma, Kunshan (CN); Yu-San Hsiao, New Taipei (TW); Shih-Wei Hsiao, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

(*) Notice: Subject to any disclaimer, the term of this patent is extended or adjusted under 35 U.S.C. 154(b) by 41 days.

(21) Appl. No.: 17/582,212

(22) Filed: Jan. 24, 2022

(65) Prior Publication Data

US 2022/0247105 A1 Aug. 4, 2022

(30) Foreign Application Priority Data

Feb. 2, 2021 (CN) ......................... 202110143825.9

(51) Int. Cl.

| | |
|---|---|
| ***H01R 12/72*** | (2011.01) |
| ***H01R 13/652*** | (2006.01) |
| ***H01R 13/40*** | (2006.01) |

(52) U.S. Cl.

CPC ........... *H01R 12/721* (2013.01); *H01R 13/40* (2013.01); *H01R 13/652* (2013.01)

(58) Field of Classification Search

CPC ..... H01R 12/721; H01R 13/40; H01R 13/652

(Continued)

(56) References Cited

U.S. PATENT DOCUMENTS 6,824,413 B1 * 11/2004 Shipe ................. H01R 12/7005 439/157

6,902,442 B2 * 6/2005 Huang ................. H01R 12/716 439/736

(Continued)

FOREIGN PATENT DOCUMENTS

CN 205693075 U 11/2016

CN 205811129 U * 12/2016

(Continued)

*Primary Examiner* — Peter G Leigh

(74) *Attorney, Agent, or Firm* — Ming Chieh Chang

(57) ABSTRACT

An electrical connector includes an insulative housing defining a mating surface and a mating slot recessed from the mating surface and extending in a longitudinal direction, plural conductive terminals arranged on the insulative housing, and a pair of reinforcing members. The insulative housing comprises two side walls extending along the longitudinal direction and two end walls connecting with the side walls. The conductive terminal comprises a contact portion protruding into the mating slot and a soldering portion extending out of the insulative housing. Each of the end walls defines a groove penetrating the mating surface and communicating with the mating slot and an exterior in the longitudinal direction. Each reinforcing member comprises an end wall portion and a fixing portion retained in the insulative housing. The end wall portion is accommodated in a corresponding groove to complete a corresponding end wall of the insulative housing.

3 Claims, 15 Drawing Sheets

(58) Field of Classification Search
USPC .......................................................... 439/637
See application file for complete search history.

(56) References Cited

U.S. PATENT DOCUMENTS

| | | | | |
|---|---|---|---|---|
| 6,923,659 | B2 * | 8/2005 | Zhang .................. | H01R 12/716 439/74 |
| 7,351,091 | B1 * | 4/2008 | Zhang ................ | H01R 12/7011 439/459 |
| 7,699,644 | B2 * | 4/2010 | Szczesny ........... | H01R 12/7005 439/377 |
| 10,141,697 | B2 * | 11/2018 | Wang ................. | H01R 13/6581 |
| 10,680,361 | B2 * | 6/2020 | Soh .................... | H01R 12/7011 |
| 2009/0088003 | A1 * | 4/2009 | Szczesny ........... | H01R 12/7005 439/62 |
| 2018/0212376 | A1 * | 7/2018 | Wang ................... | H01R 13/502 |
| 2019/0199023 | A1 * | 6/2019 | Soh .................... | H01R 12/7064 |
| 2019/0326715 | A1 * | 10/2019 | Chen .................... | H01R 12/716 |
| 2020/0203867 | A1 * | 6/2020 | Lu .......................... | H01R 13/26 |
| 2020/0335890 | A1 | 10/2020 | Fit | |

FOREIGN PATENT DOCUMENTS

| | | | | | |
|---|---|---|---|---|---|
| CN | 208336560 | U | | 1/2019 | |
| CN | 208797209 | U | * | 4/2019 | |
| CN | 208904327 | U | | 5/2019 | |
| CN | 110391518 | A | * | 10/2019 | ........... H01R 12/716 |
| TW | M582698 | U | | 8/2019 | |

* cited by examiner

ELECTRICAL CONNECTOR WITH A REINFORCING MEMBER

BACKGROUND OF THE INVENTION

1. Field of the Invention

The present invention relates to an electrical connector, and particularly to the electrical connector with a better strength.

2. Description of Related Arts

China Patent No. 208904327 discloses an electrical connector including an insulative housing and conductive terminals received in the insulative housing. The insulative housing includes two side walls spaced from and parallel with each other and two end walls connecting with opposite ends of the side walls and defining a mating slot between the two side walls. The side walls are provided with terminal slots. The conductive terminals are held in the insulative housing and comprise contacting sections arranged in the terminal slots and soldering sections extending out of the insulative housing. When the electrical connector is plugged into a mating connector, a tongue portion of the mating connector may destroy the end walls due to oblique insertions or mis-insertion.

Therefore, it is desired to provide an electrical connector with a better strength.

SUMMARY OF THE INVENTION

An electrical connector comprises: an insulative housing defining a mating surface and a mating slot recessed from the mating surface and extending in a longitudinal direction, the insulative housing comprising two side walls extending along the longitudinal direction and two end walls connecting with opposite longitudinal ends of the side walls; a plurality of conductive terminals arranged on the side walls and comprising respective contact portions protruding into the mating slot and respective soldering portions extending out of the insulative housing; and a pair of reinforcing members retained on the end walls of the insulative housing, wherein each of the end walls defines a groove penetrating the mating surface and communicating with the mating slot and an exterior in the longitudinal direction, each reinforcing member comprises an end wall portion and a fixing portion retained in the insulative housing, and the end wall portion is accommodated in corresponding groove to complete a corresponding end wall of the insulative housing.

Other advantages and novel features of the invention will become more apparent from the following detailed description of the present embodiment when taken in conjunction with the accompanying drawings.

Figure 1:
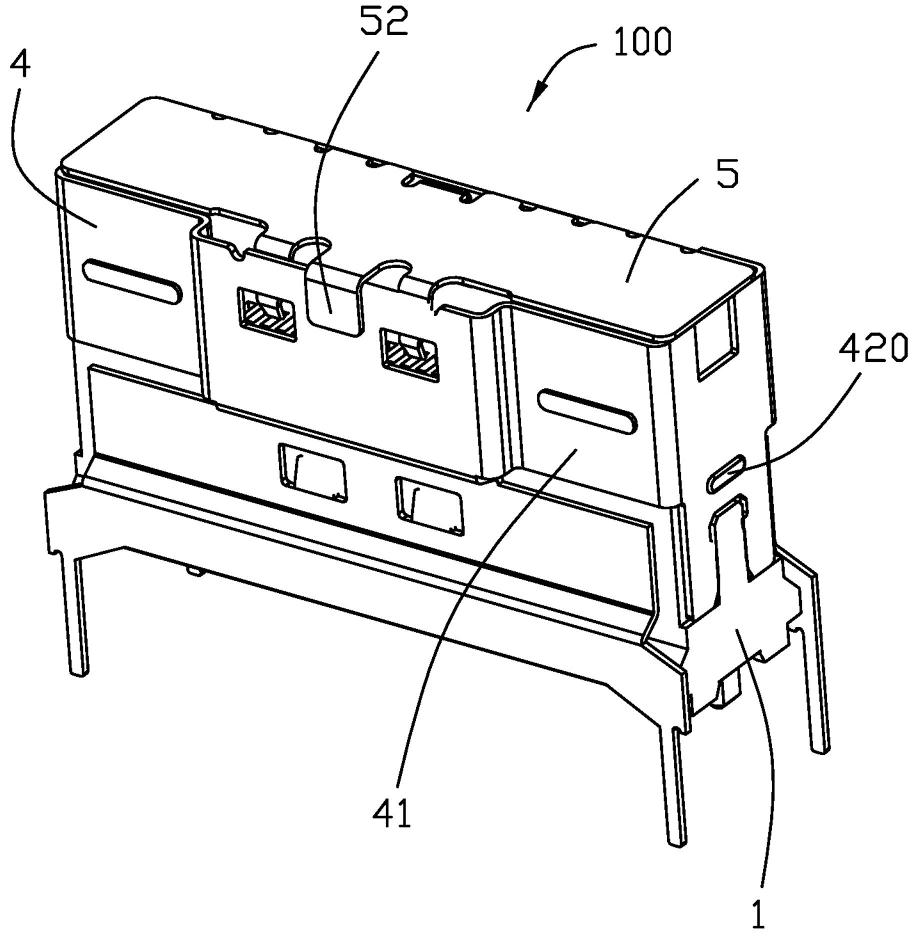
FIG. 1 is a perspective view of an electrical connector of a first embodiment of the present invention.
Figure 2:
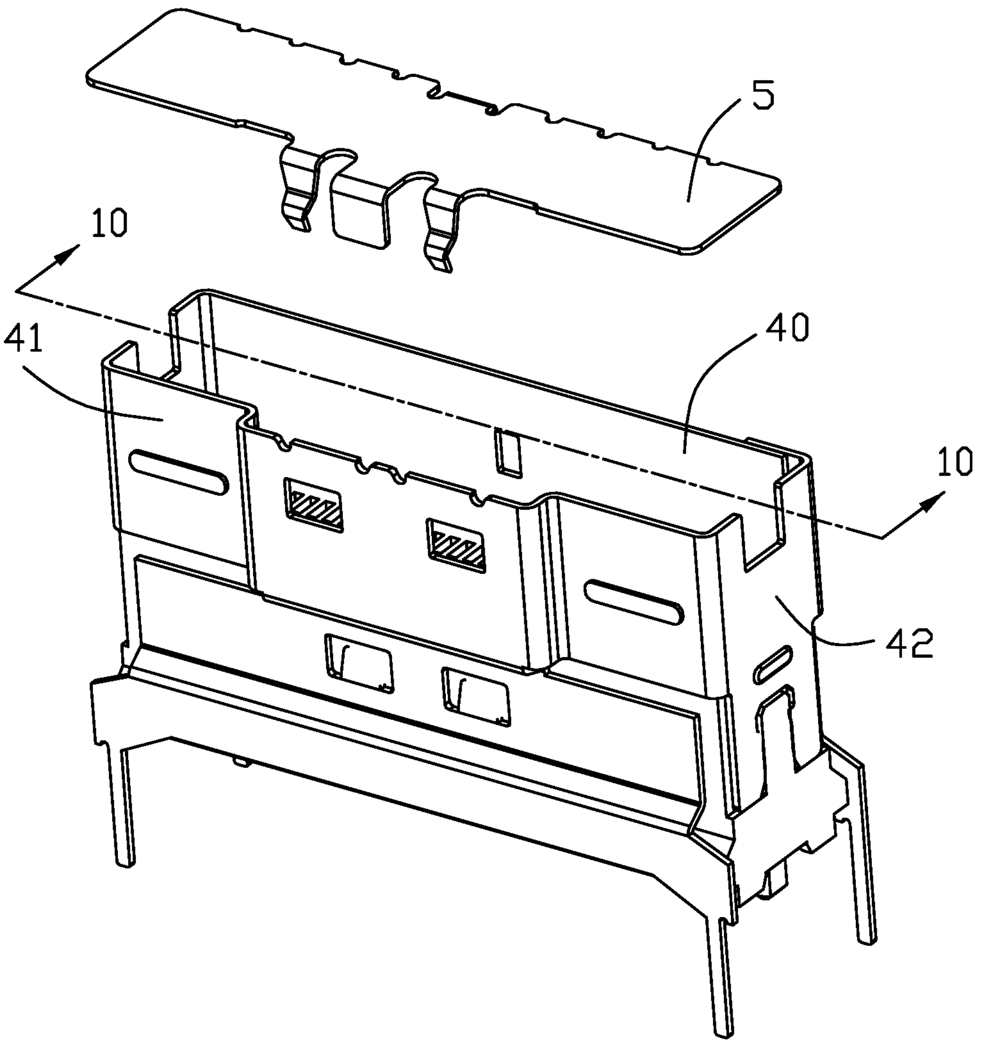
FIG. 2 is an exploded perspective view of the electrical connector of FIG. 1, wherein a cover moves away from the electrical connector.
Figure 4:
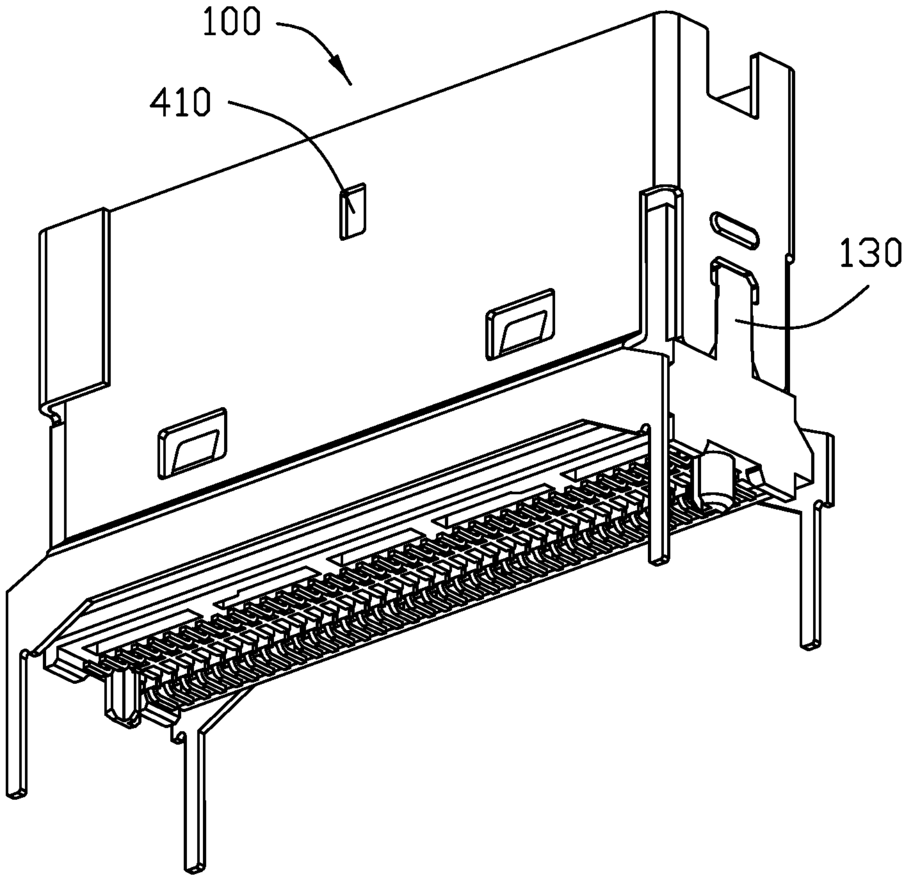
Figure 5:
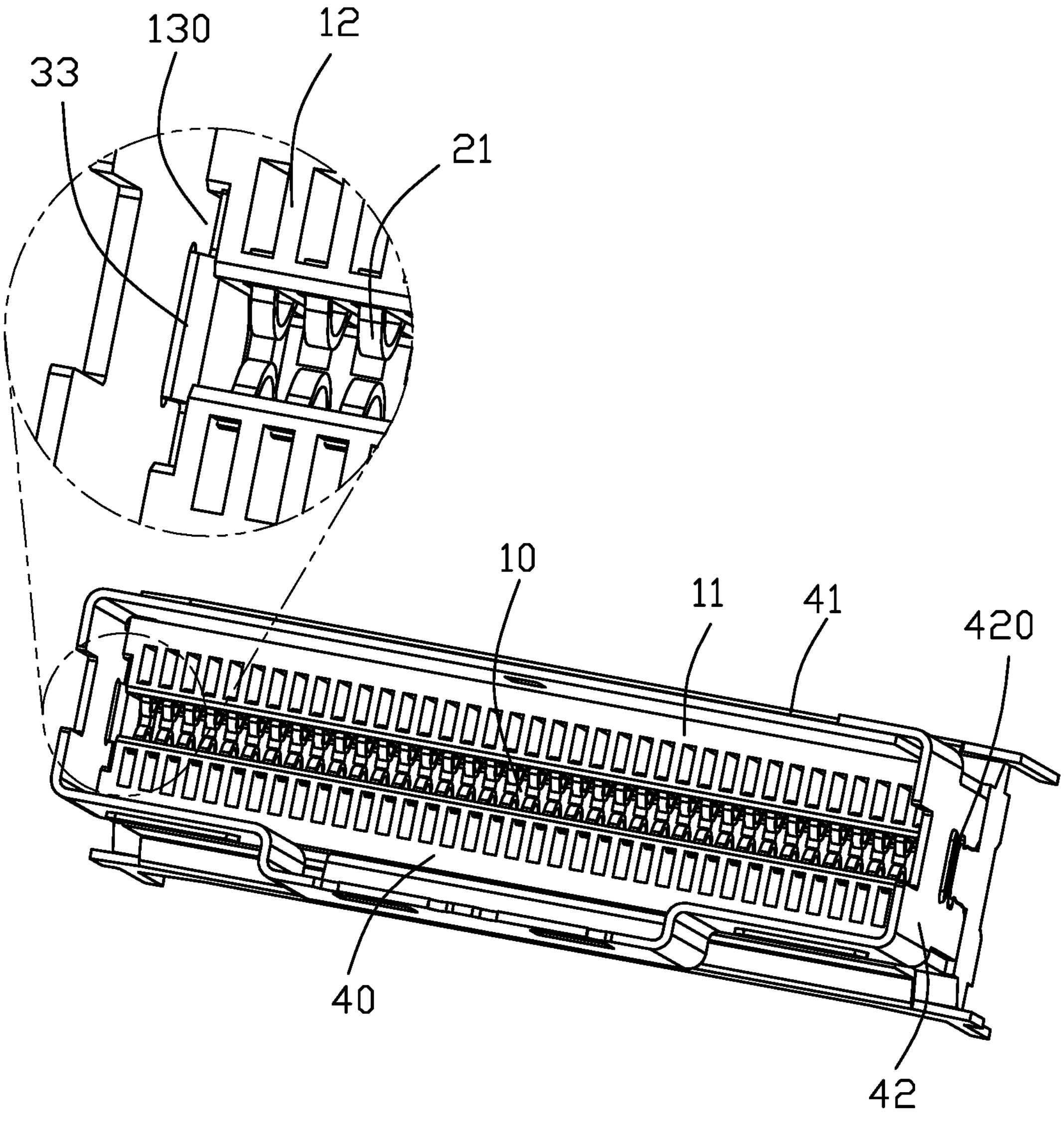
Figure 6:
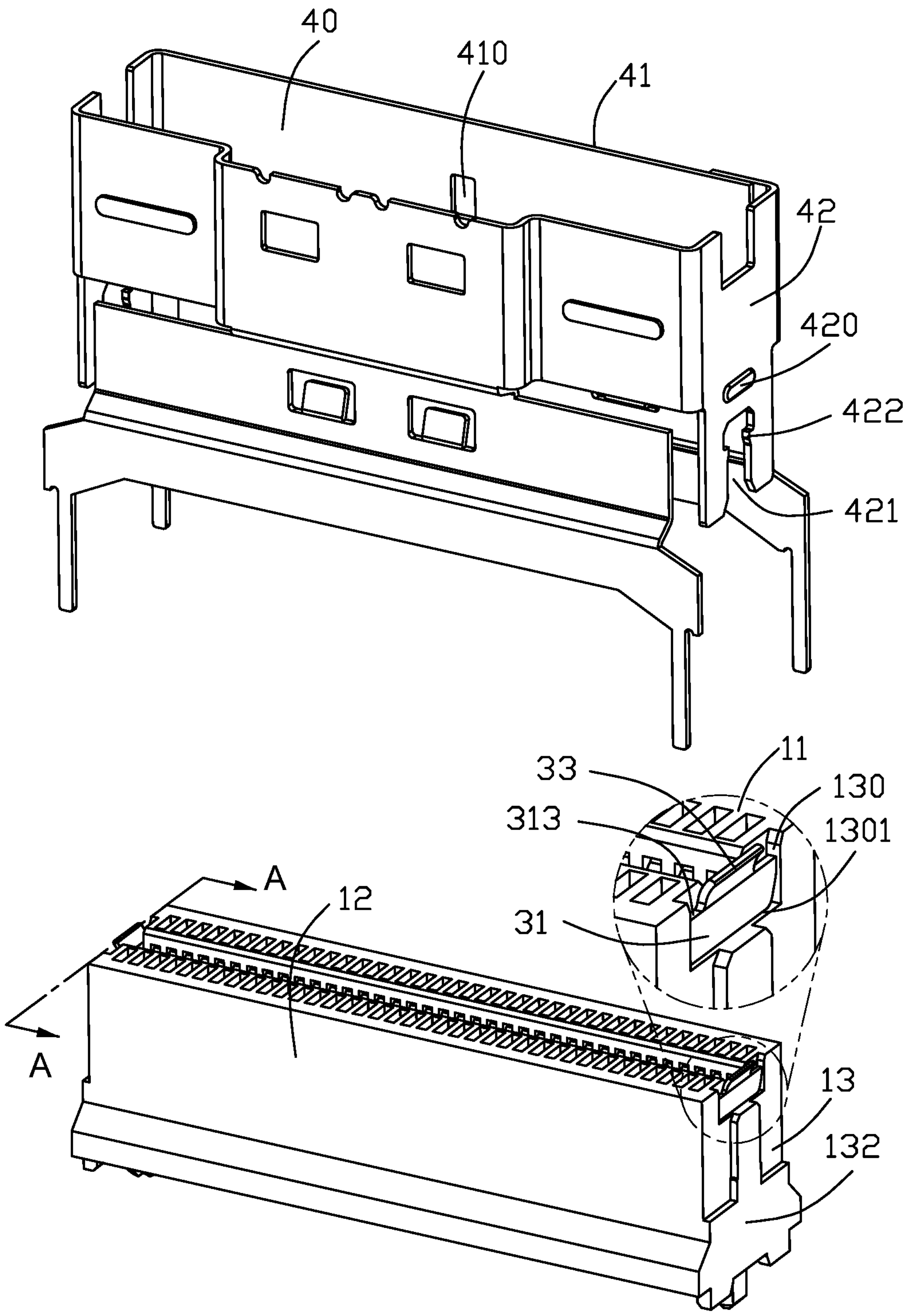
Figure 7:
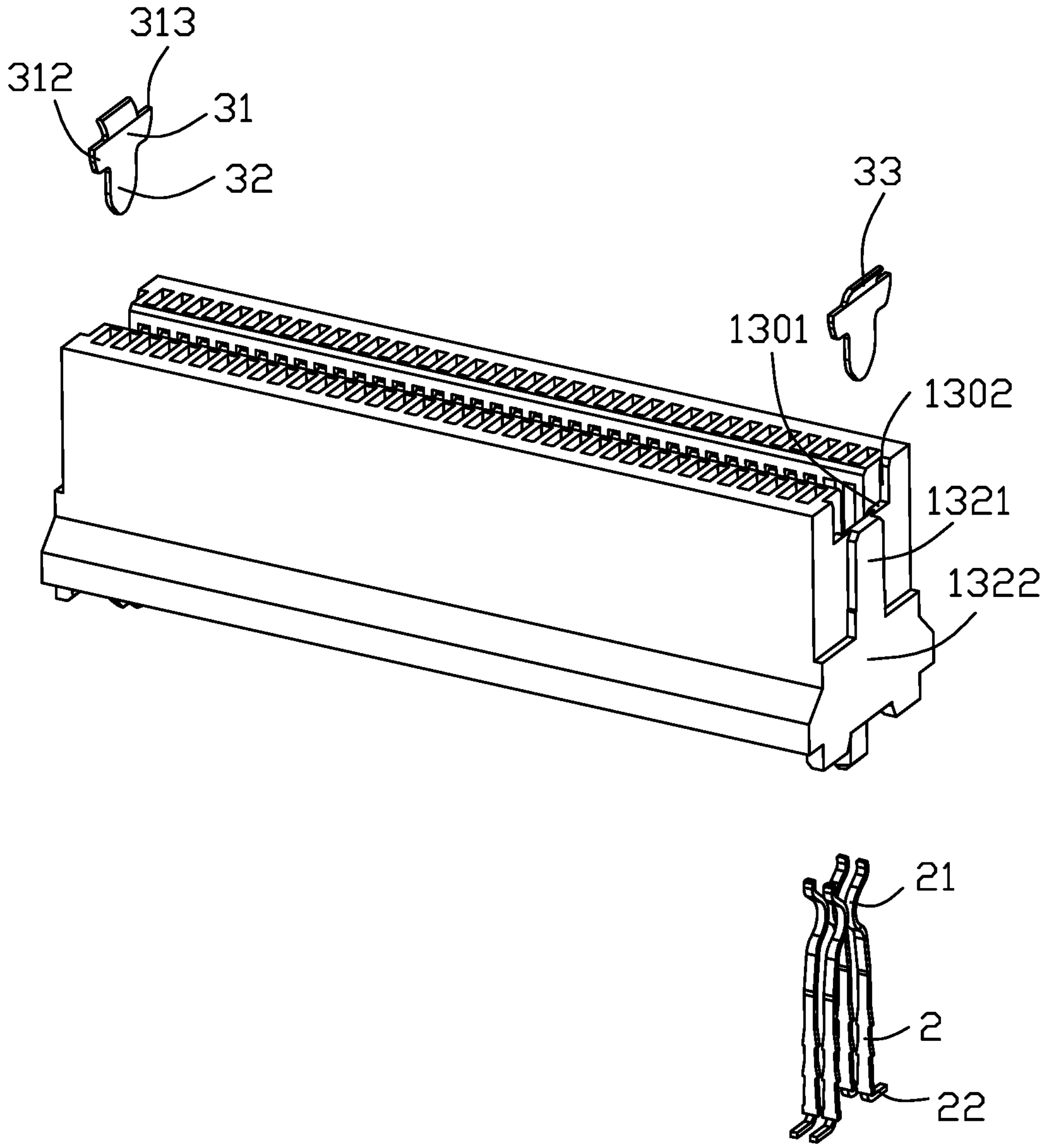
Figure 8:
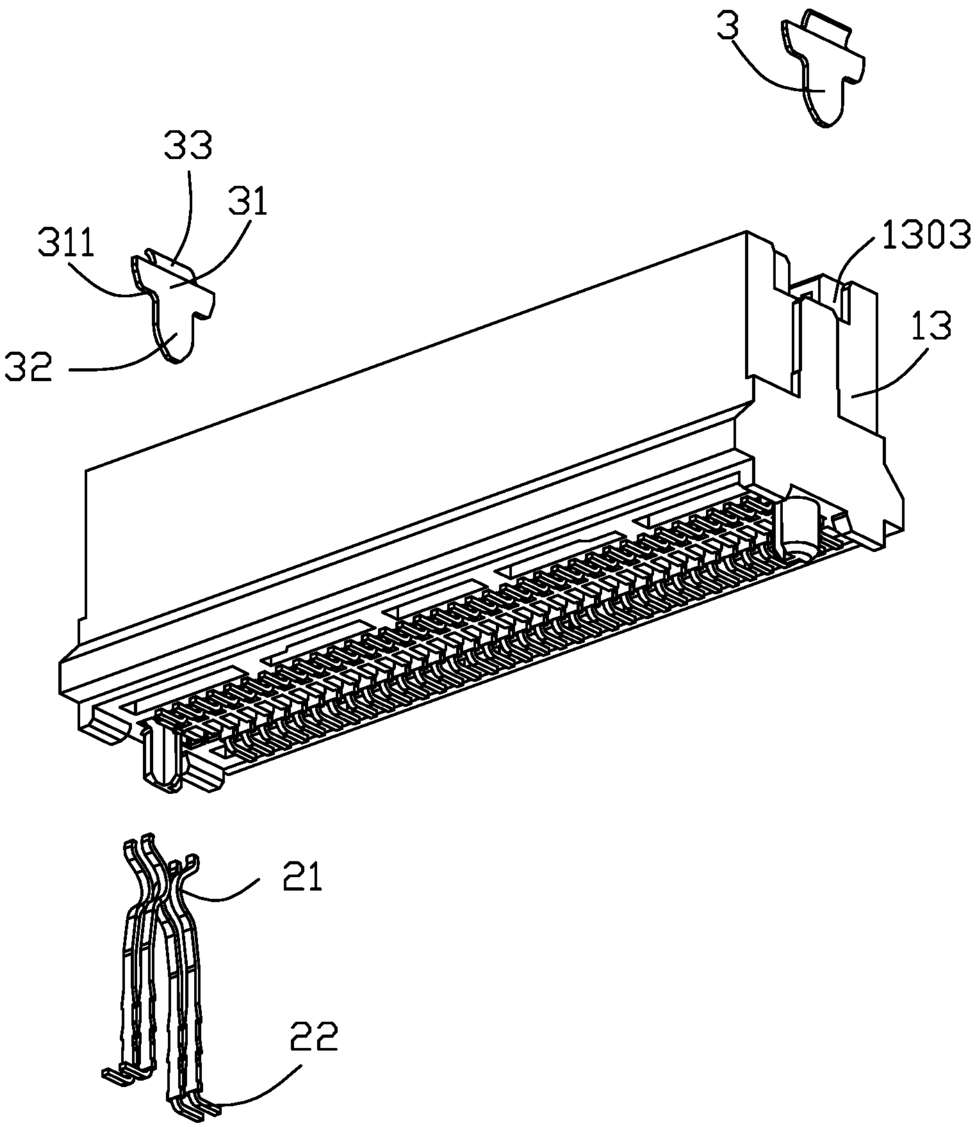
Figure 9:
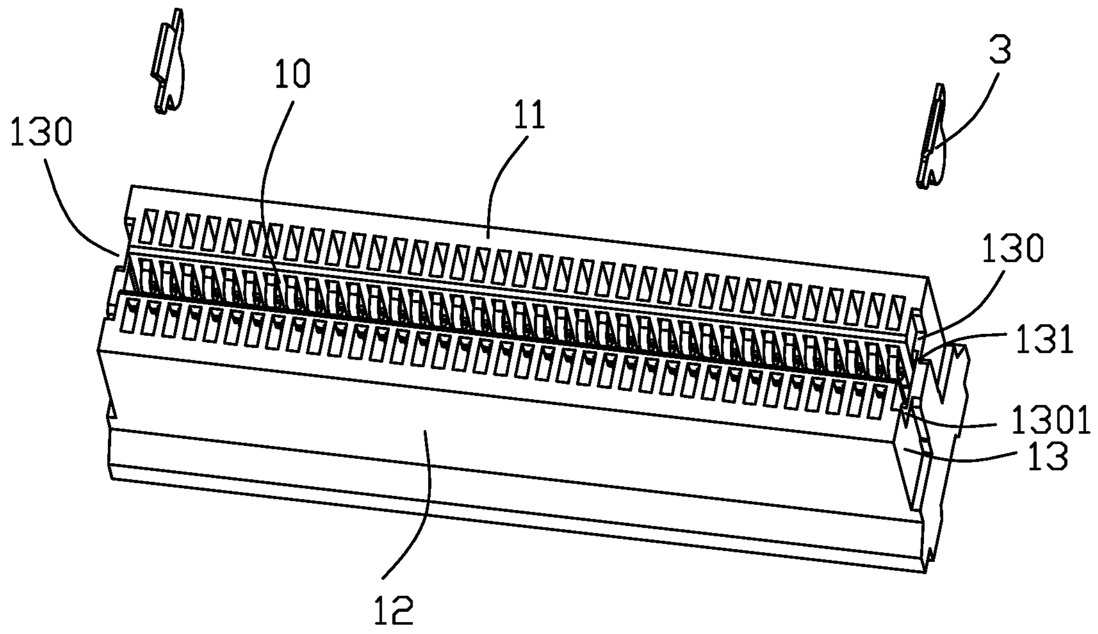
Figure 10:
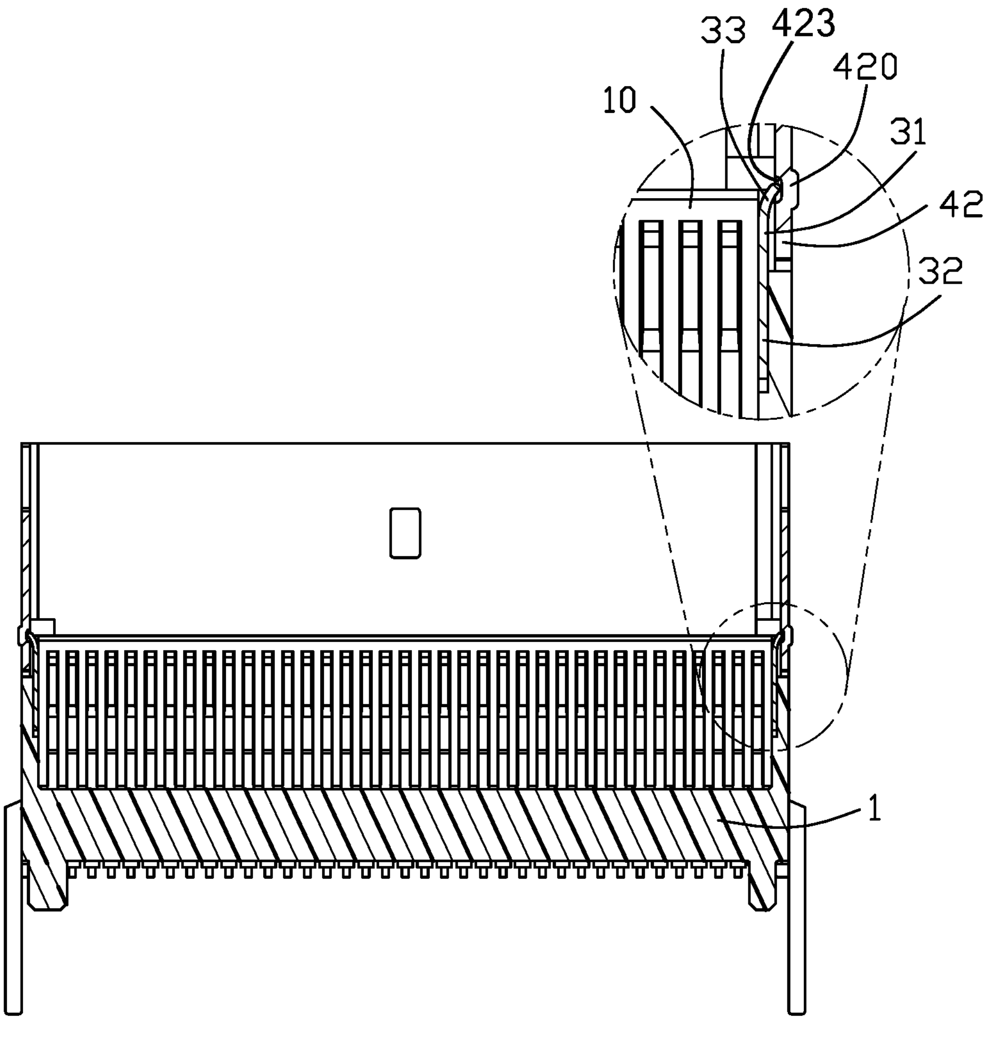
Figure 11:
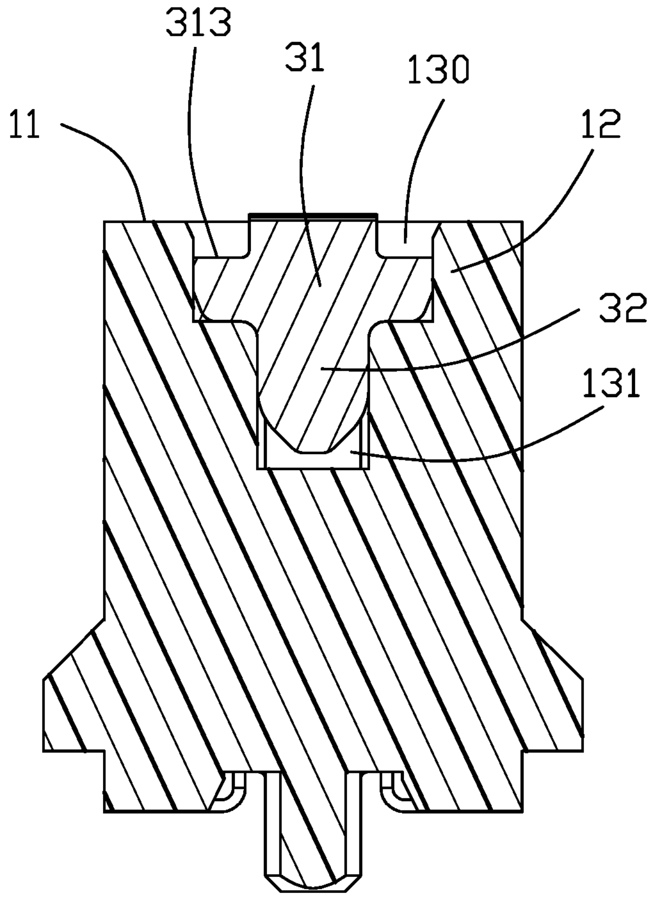
Figure 12:
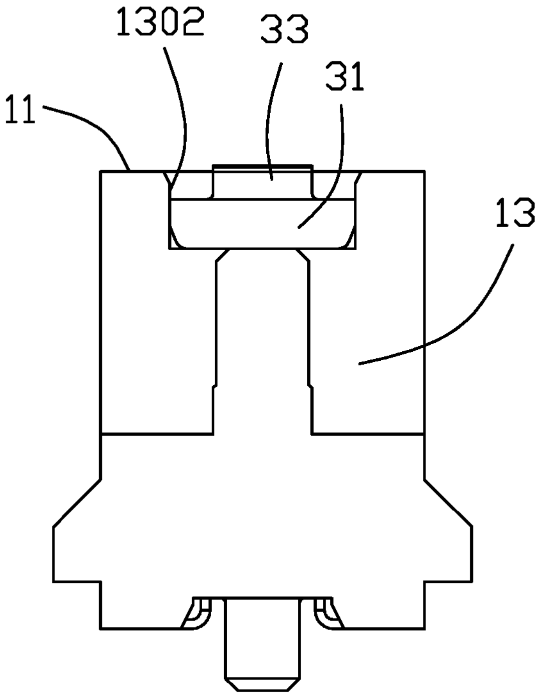

2;

FIG. 4 is another perspective view of the electrical connector of FIG. 1 without the cover;

FIG. 5 is another perspective view of the electrical connector of FIG. 4;

FIG. 6 is a further exploded perspective view of the electrical connector of FIG. 2;

FIG. 7 is a further exploded perspective view of the electrical connector of FIG. 6 without a metallic shell;

FIG. 8 is another perspective view of the electrical connector of FIG. 7;

FIG. 9 is another perspective view of the electrical connector of FIG. 7;

FIG. 10 is a cross-sectional view of the electrical connector of FIG. 2 taken along lines 10-10;

FIG. 11 is a cross-sectional view of the electrical connector of FIG. 6 taken along lines A-A;

FIG. 12 is a side view of the electrical connector of FIG. 6 without the metallic shell.

Figure 13:
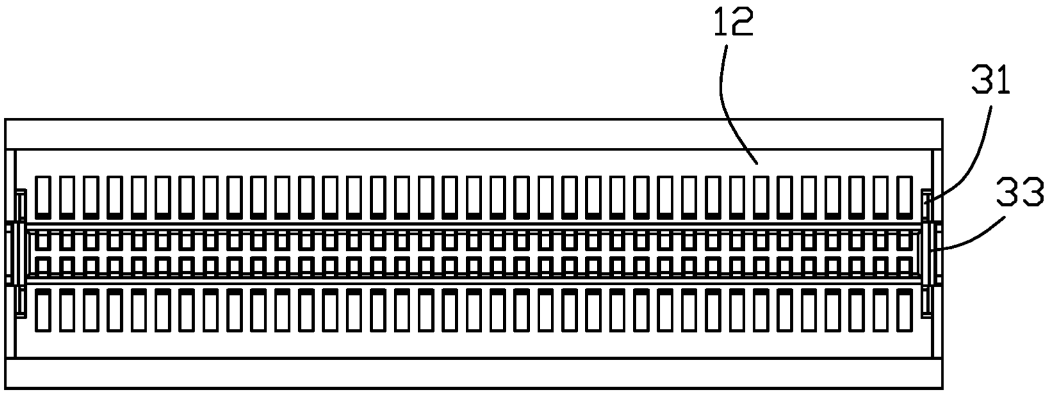

FIG. 13 is a top view of the electrical connector of FIG. 6 without the metallic shell.

Figure 14:
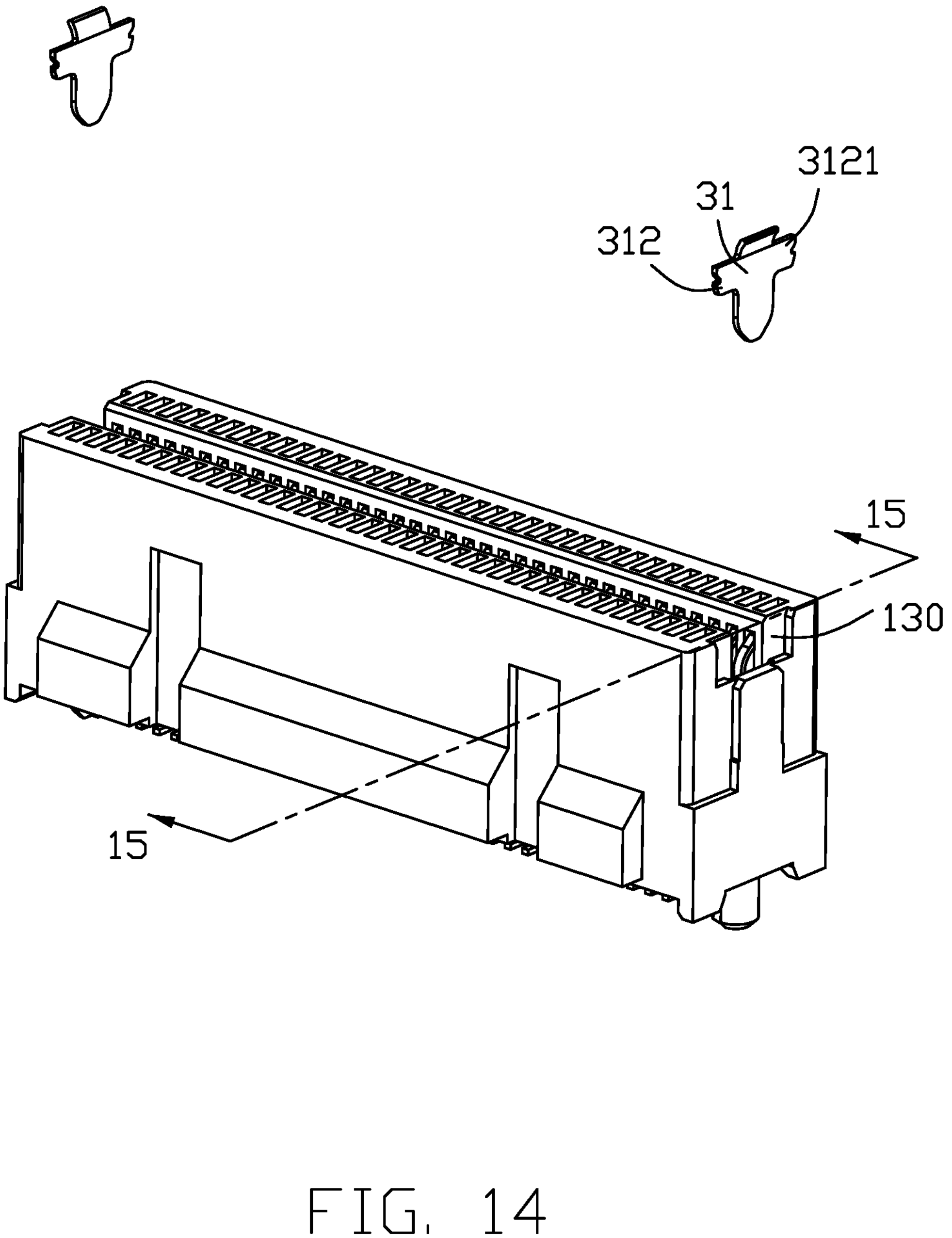
Figure 15:
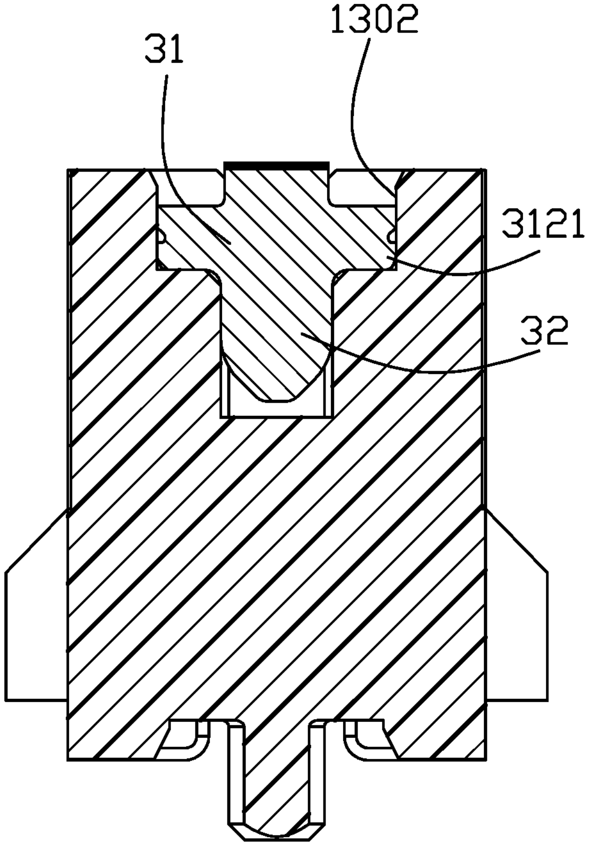

FIG. 14 is a perspective view of an electrical connector of a second embodiment of the present invention; and FIG. 15 is a cross-sectional view of the electrical connector of FIG. 14 taken along lines 15-15 wherein the electrical connector is assembled with the reinforcing member.

DETAILED DESCRIPTION OF THE PREFERRED EMBODIMENT

Reference will now be made in detail to the preferred embodiments of the present invention. Referring to FIGS. 1-13 illustrating an electrical connector 100 of a first embodiment of this invention, the electrical connector 100 is an upright type, with an upright mating direction.

As shown in FIGS. 1-8, the electrical connector 100 includes an insulative housing 1, a plurality of conductive terminals 2, and a pair of reinforcing members 3 retained in the housing 1. The insulative housing 1 defines a mating surface 11 and a mating slot 10 recessed from the mating surface 11 and extending in a longitudinal direction. The electrical connector 100 comprising two side walls 12 extending along the longitudinal direction and two end walls 13 connecting with opposite longitudinal ends of the side walls 12. The plurality of conductive terminals 2 is received in the insulative housing 1 and comprises contact portions 21 protruding into the mating slot 10 and soldering portions 22 extending out of the insulative housing 1. Each of the end walls 13 is provided with a groove 130 opening to the mating surface 11 and exposed to an exterior along the longitudinal direction. In a preferred embodiment, each of the end walls 13 is provided with the groove 130. The groove 130 penetrates the end wall 13 along the longitudinal direction to communicate with the mating slot 10. The reinforcing member 3 includes an end wall portion 31 and a fixing portion 32 received in the insulative housing 1. The end wall portion 31 is accommodated in the groove 130 to complete a part of the end wall 13 of the insulative housing 1. Preferably, the reinforcing member 3 is made of metal material, which is beneficial to make the weak end wall 13 of the insulative housing 1 have a better strength. When the electrical connector 100 is plugged into a mating connector (not shown), the end wall 13 avoids to be destroyed by oblique insertion or mis-insertion of the tongue mating portion of the mating connector.

Referring to FIGS. 6 and 12, the reinforcing member 3 includes a guide portion 33 extending upward and outward obliquely from a top edge 313 of the end wall portion 31. That is, the guide portion 33 extends beyond the mating surface 11 and inclines outward in the longitudinal direction. The guide portion 33 can guide the tongue mating portion of the mating connector to be inserted into the mating slot 10, which can effectively prevent the end wall 13 from being damaged by the tongue mating portion of the mating connetor. The guide portion 33 goes upward through the mating surface 11. Viewed from the longitudinal direction as best shown in FIG. 13, the guide portion 33 overlaps the side walls 12 in the longitudinal direciton. Referring to FIGS. 8-11, an inner surface (not labeled) of the end wall 13 is provided with a retained slot 131 located below the groove 130. The inner surface of the end wall 13 is a side surface facing the mating slot 10. The i retained slot 131 and the mating slot 130 communicates with each other. The fixing portion 32 of the reinforcing member 3 extends downward from the end wall portion 31 and is received and retained in the retained slot 131. The fixing portion 32 and the end wall portion 31 face the mating slot 10in the longitudinal direction. During assembly, the reinforcing members 3 are inserted into the grooves 130 in a top to bottom direction. A bottom edge 311 of the end wall portion 31 abuts against an inner bottom face 1301 of the groove 130 for preventing the reinforcing member 3 from being over-inserted.

As shown in FIGS. 7-13, the groove 130 extends to the two side walls 12 in the transverse direction. A transverse end 312 of the end wall portion 31 abuts against a transverse inner face 1302 of the groove 130. A top edge 313 of the end wall portion 31 is lower than the mating surface 11. Referring to FIGS. 14-15 illustrating a part of an electrical connector of the second preferred embodiment of the invention, the electrical connector has a similar interface to the electrical connector 100. Main features are descripted hereinafter, and the same elements are labeled with same numerals corresponding to the first embodiment. The transverse end 312 of the end wall portion 31 is provided with barbs 3121. The barbs 3121 are held with the transverse inner face 3102 of the groove 310. In this way, the stability of the assembly of the reinforcing member 3 and the insulative housing 1 can be enhanced, and the reinforcing member 3 will not easily come out of the insulative housing 1 due to the plugging and unplugging of the mating connector.

Referring to FIGS. 7-11, the retained slot 131 is recessed from the inner surface of the end wall 13 and at least partially overlaps the side wall 12 in the transverse direction, so that the fixing portion 32 can be sandwiched between the side wall 12 and the end wall 13 for having a better holding effect. In the transverse direction, the length of the groove 130 is longer than the length of the retained slot 131. The portion of the groove 130 beyond the transverse ends of the interference groove 131 forms the inner bottom face 1301 facing upward. The bottom edge 311 of the end wall portion 31 is supported on the inner bottom face 1301.

Referring to FIGS. 1-9, the electrical connector 100 includes a metallic shell 4 surrounding the insulative housing 1 and includes two first plates 41 located corresponding to the two side walls 12 and a pair of second plates 42 connecting with opposite longitudinal ends of the first plates 41 and located outside the end walls 13. The second plate 42 is provided with an outward bulge portion 420 protruding from the inside to the outside with a recess 423 at a back of the outward bulge portion 420. The extending end of the guide portion 33 abuts on the recess 423. The matching structure of the guide portion 33 and the recess 420 helps to enhance the holding effect between each other, so as to prevent the reinforcing member 3 from being dislodged easily. The end wall 13 includes an inverted T-shaped convex portion 132 protruding outward from an outer surface thereof. The convex portion 132 includes a clamping block 1321 extending in an up-down direction and an abutting block 1322 being perpendicular to and located below the clamping block 1321. A lower end of the second plate 42 is recessed with a notch 421 extending in the up-down direction. The clamping block 1321 is clamped in the notch 421. Each end of the second plates 42 located on both sides of the notch 421 abuts against the abutting block 1322. The second plate 42 includes a thorn 422 protruding into the notch 421. The thorn 422 is held on the clamping block 1321. The metallic shell 4 is assembled to the insulative housing 1 from top to bottom until the lower end of the second plate 42 abuts against the abutting block 1322. The thorn 422 is fixed with the clamping block 1321 for preventing the metallic shell 4 from being pulled out of the insulative housing 1 upward.

Referring to FIGS. 6-10, in the transverse direction, the portion of the groove 130 beyond the mating slot 10 forms an outward abutting surface 1303. The end wall portion 31 of the reinforcing member 3 is sandwiched between the abutting surface 1303 and the second plate 42 in the inner and outer directions to enhance the stability of the end wall portion 31.

Referring to FIG. 5, the first plate 41 and the second plate 42 extend over the mating surface 11. The two first plates 41 and a pair of the second plates 42 form a receiving cavity 40 together. The receiving cavity 40 is used for accommodating the mating connector. When the mating connector is plugged with the electrical connector 100, the receiving cavity 40 has a preliminary guiding effect on the mating connector. After the tongue mating portion of the mating connector enters the receiving cavity 40, the guide portion 33 can further guide the tongue to be inserted into the mating slot 10 accurately. The end wall portion 31 forms a part of the end wall 13 of the insulative housing 1 adjacent to the mating surface 11. Because the end wall portion 31 has high strength and good friction resistance, which can effectively protect the end wall 13 from damage.

Figure 3:
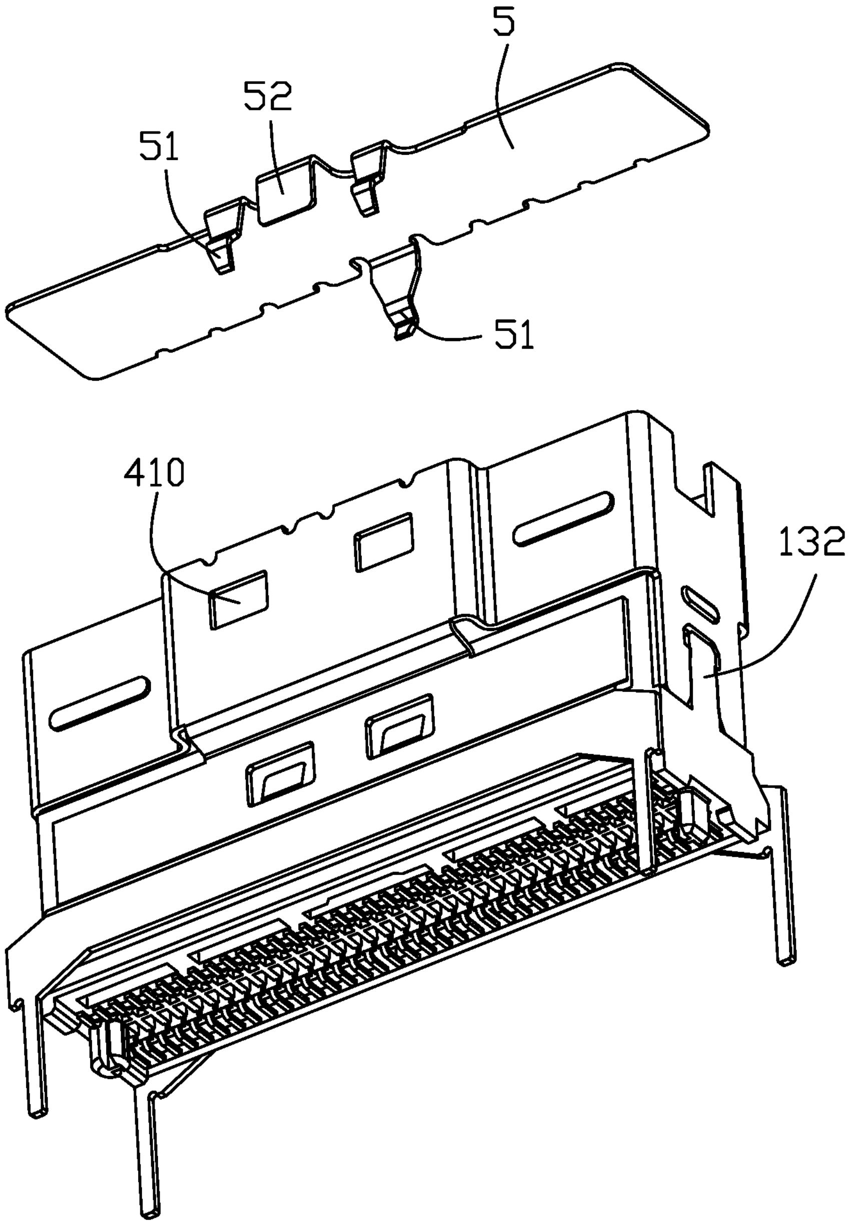
FIG. 3 is another perspective view of the electrical connector of FIG.

As shown in FIGS. 1-3, the electrical connector 100 includes a cover 5 shielding a mating face of the receiving cavity 40. A elastic hooks 51 bends and extending downward from each transverse end of the cover 5, corresponding to the first plate 41. The first plate 41 is provided with through holes 410. The elastic hooks 51 extend to the receiving cavity 40 and are elastically buckled in the through hole 410. The cover 5 is covered and fixed to the mating faceof the metallic shell 4 through the cooperation of the elastic hooks 51 and the through holes 41. When the electrical connector 100 is in a transported or unused state, the cover 5 can prevent dirty from entering the receiving cavity 40 and the mating slot 10. In a preferred embodiment, at least two elastic hooks 51 are disposed on one side of the cover 5. The one side of the cover 5 provided with at least two elastic hooks 51 further includes a buckling piece 52 bending and extending backward. The buckling piece 52 is disposed between the two elastic hooks 51 and closely attached to an outer surface of the first plate 41. The buckling piece 52 is convenient for the user to grasp to realize the disassembly and assembly of the cover 5.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. An electrical connector comprising:

a longitudinal insulative housing defining a mating face and comprising two side walls extending along the longitudinal direction and two end walls connecting with opposite longitudinal ends of the side walls, the side walls and the end walls commonly defining a mating slot;

a plurality of conductive terminals arranged on the side walls and extending into the mating slot;

a metallic shell surrounding the insulating housing and defining a respective outward bulge portion near each of the two end walls, the outward bulge portion having a recess on a back thereof; and a respective reinforcing member retained on each of the two end walls of the insulative housing;

wherein the reinforcing member comprises a guide portion slanting beyond the mating face and away from the mating slot in the longitudinal direction, and the guide portion abuts against the recess of the outward bulge portion.

2. The electrical connector as claimed in claim 1, wherein the end wall defines a groove communicating with the mating slot and an exterior in the longitudinal direction, and the reinforcing member comprises an end wall portion received in the groove to complete the end wall and a fixing portion retained in the end wall below the groove.

3. The electrical connector as claimed in claim 1, wherein the guiding guide portion and the end wall portion overlap the side walls in the longitudinal direction.

* * * * *